G. ADLLMO & J. MIGNONE.
EGG TESTER.
APPLICATION FILED AUG. 28, 1916.

1,209,651.

Patented Dec. 26, 1916.
2 SHEETS—SHEET 1.

John Mignone
and George Adelmo
INVENTORS.

BY
ATTORNEYS.

John Mignone
and George Adelmo
INVENTORS.

UNITED STATES PATENT OFFICE.

GEORGE ADELMO AND JOHN MIGNONE, OF SPRINGVALLEY, ILLINOIS.

EGG-TESTER.

1,209,651.　　　　Specification of Letters Patent.　　Patented Dec. 26, 1916.

Application filed August 28, 1916.　Serial No. 117,216.

*To all whom it may concern:*

Be it known that we, GEORGE ADELMO, a subject of the King of Italy, and JOHN MIGNONE, a citizen of the United States, residing at Springvalley, in the county of Bureau and State of Illinois, have invented new and useful Improvements in Egg-Testers, of which the following is a specification.

This invention relates to apparatus for testing eggs by their translucency, and its object is to provide an apparatus of this kind which is simple in construction, and by means of which a large number of eggs can be easily and quickly tested.

The object stated is attained by means of a novel combination and arrangement of parts to be hereinafter described and claimed, and in order that the same may be better understood, reference is had to the accompanying drawings forming a part of this specification.

Figures 1, 2:
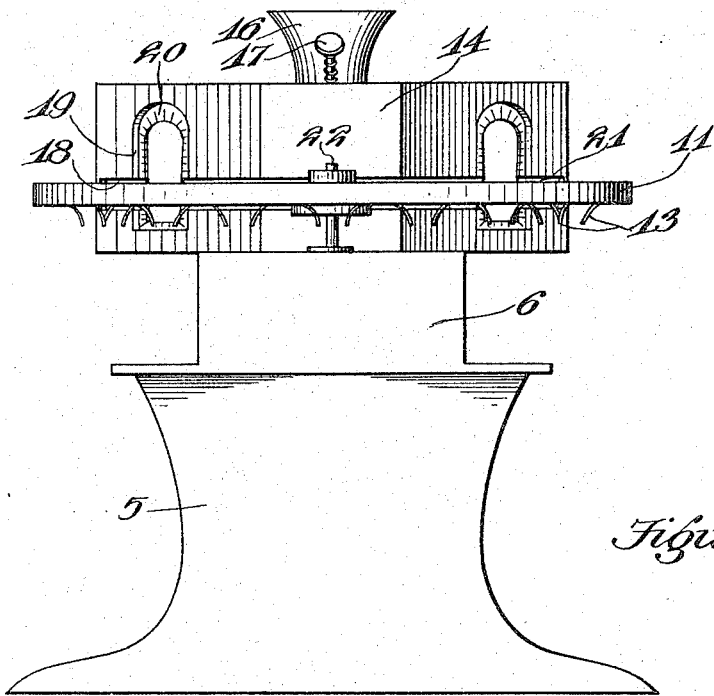
Figure 3:
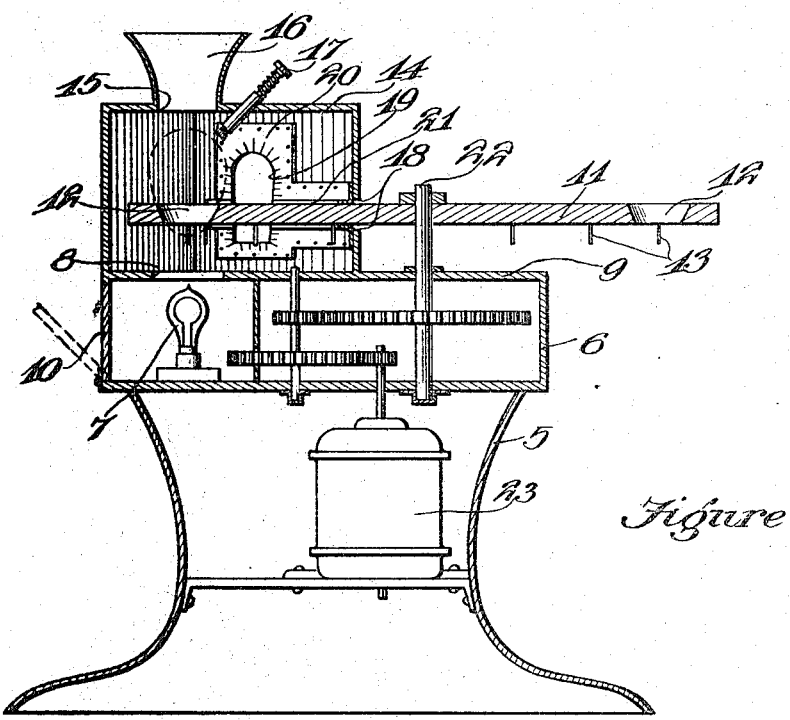
Figure 4:
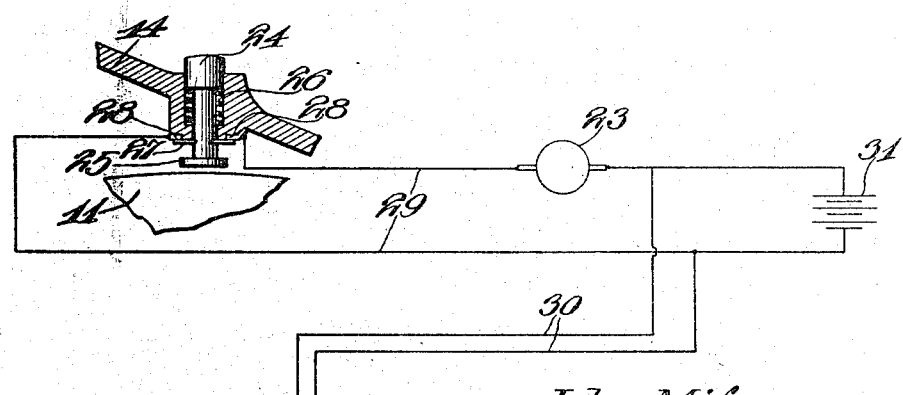

In the drawings, Figure 1 is a front elevation of the apparatus; Fig. 2 is a plan view thereof, partly broken away; Fig. 3 is a vertical section on line 3—3 of Fig. 2; and Fig. 4 is an enlarged section of a button switch in connection with the diagram of an electrical circuit.

Referring specifically to the drawings, 5 denotes a suitable base or stand on which is mounted a housing 6 containing a lamp 7, which latter may be an ordinary incandescent electric lamp, the same being mounted in upright position on the bottom of the housing directly beneath an opening 8 in the top 9 of the housing, to shine through said opening. The housing has a side door 10 so that access to the interior thereof may be had.

Above the housing 6 is mounted a rotatable egg carrier, in the form of a circular platform or turntable 11. This carrier is horizontal and has near its periphery a series of apertures 12 to hold the eggs to be tested. On the bottom of the carrier, adjacent to the apertures, are clips 13 which engage the eggs and prevent the same from slipping through the apertures; the latter being of such diameter that when the eggs are placed therein, they project above and below the carrier when their major axes are vertical. The carrier is so positioned, and the apertures are so located, that when the carrier is rotated, the eggs, one after the other pass across the opening 8, above the same. It will therefore be evident that the condition of the eggs may be readily observed by looking down on the same, the interior of the eggs being illuminated by the lamp 7 as the eggs pass between the latter and the eye of the observer.

On top of the housing 6 is mounted an inclosure 14 for excluding all extraneous light from the eggs as they come into position above the lamp 7. In line with the opening 8, the top of the inclosure has a sight opening 15 provided with an eye shield 16. The top of the inclosure also carries a marker 17 by means of which the bad eggs may be stamped with an identifying mark.

In the side of the inclosure 14 is a slot 18 through which the carrier 11 extends. That portion of the slot through which the eggs pass is enlarged to accommodate the same, as shown at 19. The enlarged portions of the slots are provided with leather flaps 20 which fit around the eggs and exclude all extraneous light from the inclosure 14. The parts are so dimensioned and arranged that when an egg is in position to be tested, another egg is just entering the inclosure and another egg is leaving the same through the enlarged portions 19 of the slot 18, the same thus forming entrance and exit openings. The flaps 20 fit around the eggs in these openings and thereby exclude extraneous light from the inclosure while the egg on the inside of the inclosure, above the lamp 7, is being tested. The edges of the slot 18 are also provided with leather flaps 21 for the same purpose as the flaps 20.

The carrier 11 is made fast to the upper end of a vertical shaft 22 mounted in suitable bearings on the housing 6 and passing thereinto. The stand 5 supports an electric motor 23 which is geared to the shaft 22 by a set of reducing gears. The motor therefore slowly rotates the carrier 11, and the eggs are brought one after the other into position for observation. If the observer's eyesight is not keen enough to observe the eggs without stopping the carrier 11, the motor circuit may be broken to stop the motor 23, and a brake is also provided for the carrier. This motor control and brake comprises the following parts: In the side wall of the inclosure 14 is mounted a push-button 24 having at its outer end a brake shoe 25 which is positioned to engage the periphery of the carrier 11 when the button is pushed in. A spring 26 normally holds the button retracted, and returns it when it is released. The inner end of the button has contacts 27 which are opposite contacts 28 to which the current conductors 29 of the motor 23 are connected. These contacts are normally in engagement and the motor circuit is closed. If it is desired to stop the motor, it is necessary only to push the button inward, which separates the contacts and breaks the motor circuit, and at the same time, the shoe 25 is carried against the periphery of the carrier 11 to stop the same.

Back of the motor the conductors 29 have a pair of branches 30, which lead to the lamp 7. Thus, with the conductors 29 originating at the battery 31 or other current source, it will be seen from Fig. 4 that the lamp 7 continues to burn, irrespective of the action of the motor 23.

We claim:—

1. An egg-tester comprising an inclosure having a sight opening and a source of light, a rotatable egg-carrier positioned to carry the eggs through the inclosure between the sight opening and the source of light, the inclosure having openings through which the carrier and the eggs pass into and out of the inclosure, and light-shields around said openings.

2. An egg-tester comprising an inclosure having a sight opening and a source of light, a rotatable egg-carrier positioned to carry the eggs through the inclosure between the sight opening and the source of light, a motor for driving the carrier, motor-controlling means, and a brake for the carrier.

3. An egg-tester comprising an inclosure having a sight opening and a source of light, a rotatable egg-carrier positioned to carry the eggs through the inclosure between the sight opening and the source of light, a motor for driving the carrier, a brake for the carrier, and means carried by the brake for controlling the motor.

In testimony whereof we affix our signatures.

GEORGE ADELMO.
JOHN MIGNONE.

Copies of this patent may be obtained for five cents each, by addressing the "Commissioner of Patents, Washington, D. C."